United States Patent

Uchidoi et al.

[11] 3,895,864
[45] July 22, 1975

[54] OPTICAL PROJECTOR CAPABLE OF RANDOM ACCESS AND REPEAT PROJECTIONS

[75] Inventors: Masanori Uchidoi, Kawasaki; Tateo Yamada, Tokyo, both of Japan

[73] Assignee: Canon Kabushiki Kaisha, Tokyo, Japan

[22] Filed: Dec. 26, 1972

[21] Appl. No.: 318,653

[30] Foreign Application Priority Data
Dec. 29, 1971 Japan .................. 46-1239

[52] U.S. Cl. .................. 353/25; 353/103
[51] Int. Cl. .................. G03b 23/04
[58] Field of Search .................. 353/25–27, 353/116, 117, 103

[56] References Cited
UNITED STATES PATENTS

| | | | |
|---|---|---|---|
| 3,217,595 | 11/1965 | Gallina | 353/107 |
| 3,588,243 | 6/1971 | Osawa | 353/117 |
| 3,604,713 | 9/1971 | Karnopp | 274/4 F |
| 3,652,155 | 3/1972 | Schiebel | 353/116 |
| 3,704,451 | 11/1972 | Pearson | 353/25 |

FOREIGN PATENTS OR APPLICATIONS

| | | | |
|---|---|---|---|
| 1,453,338 | 8/1966 | France | 353/103 |

*Primary Examiner*—Richard E. Aegerter
*Assistant Examiner*—A. J. Mirabito
*Attorney, Agent, or Firm*—William R. Woodward

[57] ABSTRACT

A slide film projector is provided which may automatically select for projection a desired slide film out of a plurality of slide films in the random access projection mode and may automatically project sequentially and repeatedly a number of slide films arbitrarily selected from said plurality of slide films in the automatic repeat mode. A group of switches for selecting a desired slide film and means for detecting the position of said desired slide are provided for the random access projection mode. For the automatic repeat projection mode there are provided a switch for selecting a number of slide films to be sequentially and repeatedly projected and a differential amplifier for detecting the position of a slide film. In order to switch from the random access projection mode to the automatic repeat projection mode or vice versa, projection mode switching means is provided.

40 Claims, 14 Drawing Figures

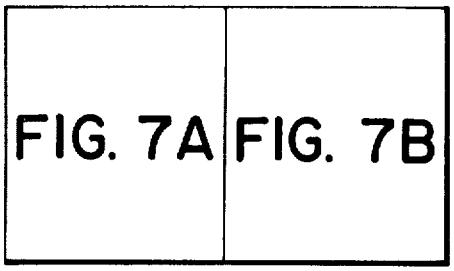
FIG. 7B
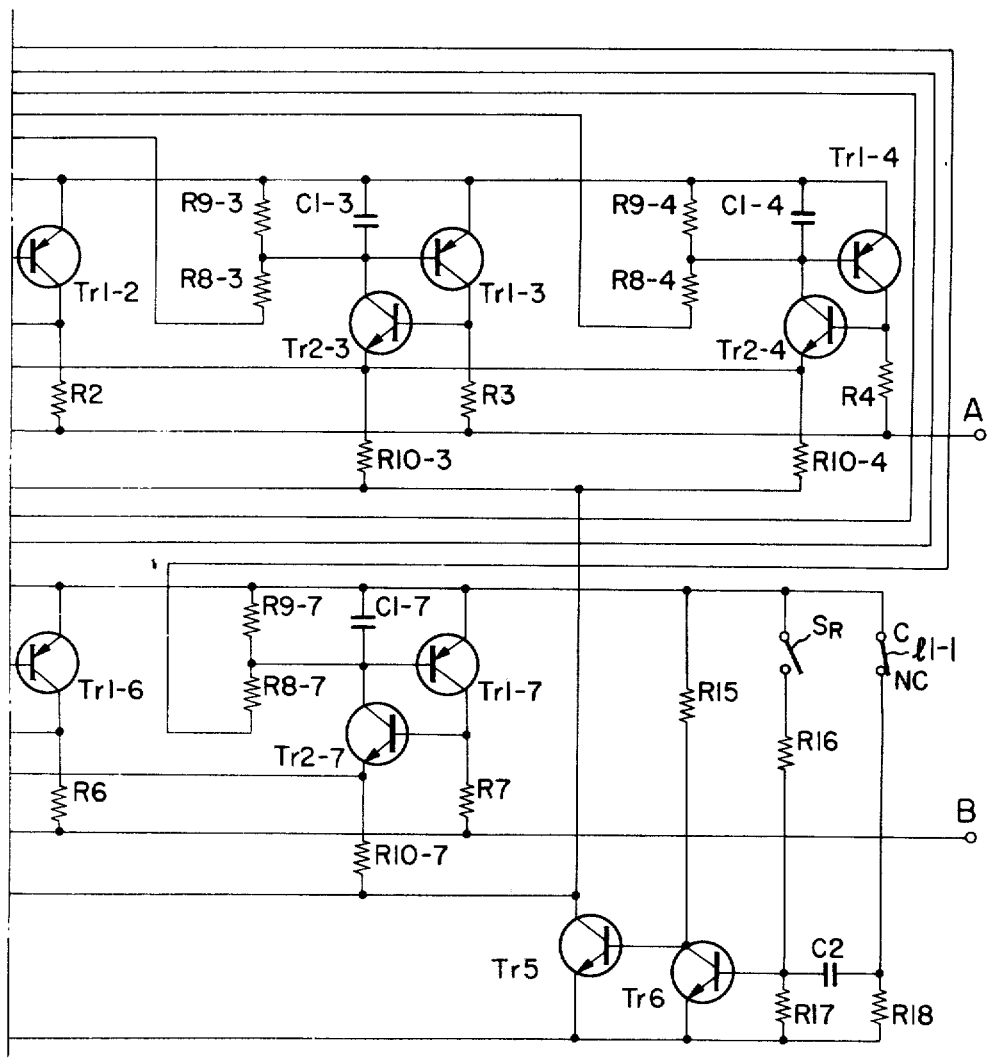

OPTICAL PROJECTOR CAPABLE OF RANDOM ACCESS AND REPEAT PROJECTIONS

BACKGROUND OF THE INVENTION

1. Field of the Invention

The present invention relates to an optical projector capable of random access to a desired slide film for projection and also capable of projecting repeatedly a number of slide films.

2. Description of the Prior Art

It is generally preferable that a slide film projector may be switched selectively to the single projection mode in which a plurality of slide films stored in a tray or magazine may be projected sequentially in the order arranged, to the random access mode in which a desired slide film is automatically selected and projected, or to the automatic repeat projection mode in which a number of slide films are arbitrarily selected out of a plurality of slide films stored in a holder and projected repeatedly.

A slide film projector provided with a random access mechanism disclosed for example in British Pat. No. 1,202,610 is provided with a rotatable slide tray and a control circuit with a manually operable selector means for random selection. Furthermore German Pat. No. 1,235,622 teaches means for use with a slide film projector for reading out the addresses attached to slide films arrayed on a disk for random access.

However, there has not yet been devised and demonstrated a slide film projector which may be selectively switched from the random access mode to the automatic repeat projection mode in which a number of slide films are automatically selected out of a plurality of slide films stored in a slide film tray, magazine or holder and projected sequentially and repeatedly.

SUMMARY OF THE INVENTION

One of the objects of the present invention is therefore to provide an optical projector provided with means for selectively switching the projector to the automatic repeat projection mode from the random access projection mode and vice versa.

Another object of the present invention is to provide an optical projector provided with means for selectively switching the projector to the random access projection mode, the automatic repeat projection mode or the single projection mode in which a plurality of slide films are projected one by one in response to the depression of a manual projection button.

The above and other objects, features and advantages of the present invention will become more apparent from the following description of one preferred embodiment thereof taken in conjunction with the accompanying drawings.

BRIEF DESCRIPTION OF THE DRAWINGS

FIGS. 7A and 7B together show the circuit diagram of the encoder, memory and reset circuits more generally shown in FIG. 1A;

DESCRIPTION OF THE PREFERRED EMBODIMENTS

Figure 1A:
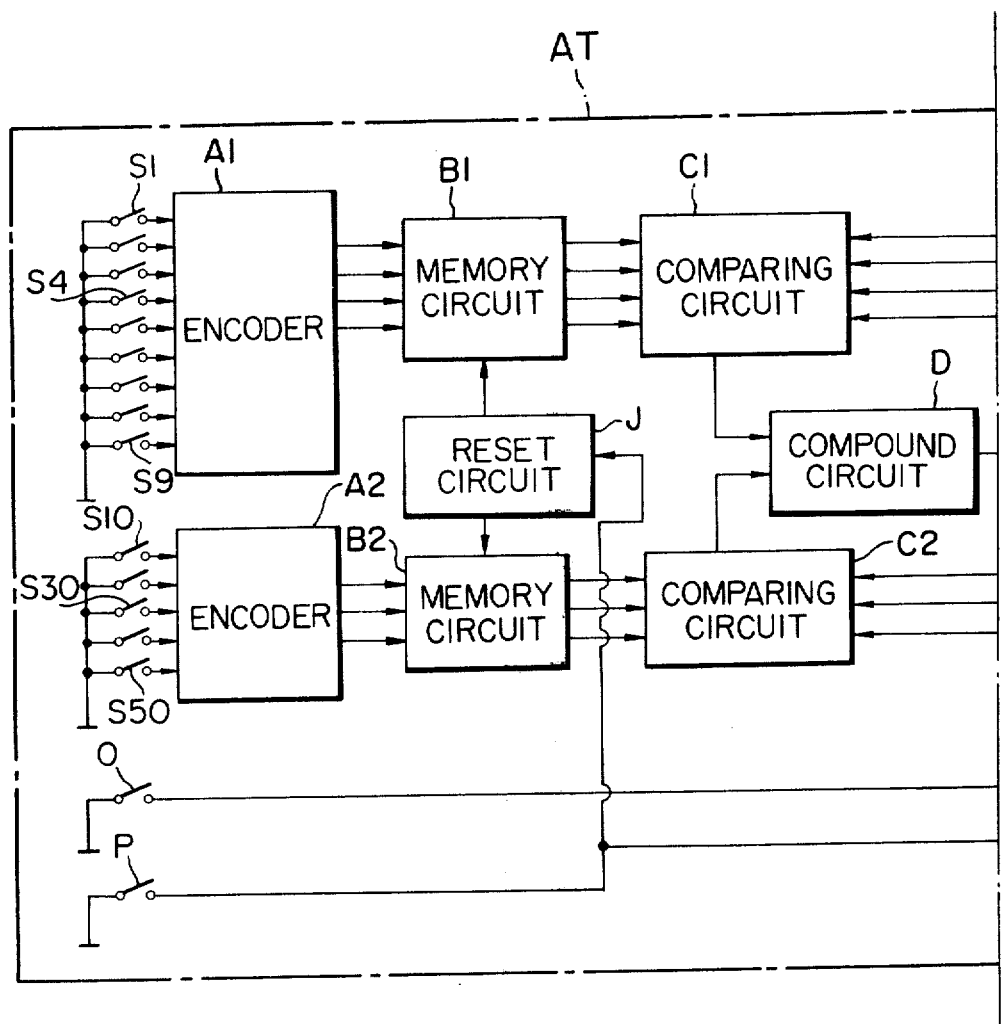
FIG. 1A is a block diagram of the encoder, memory and comparing circuits of embodiment of a slide film projector in accordance with the present invention.
Figure 1B:
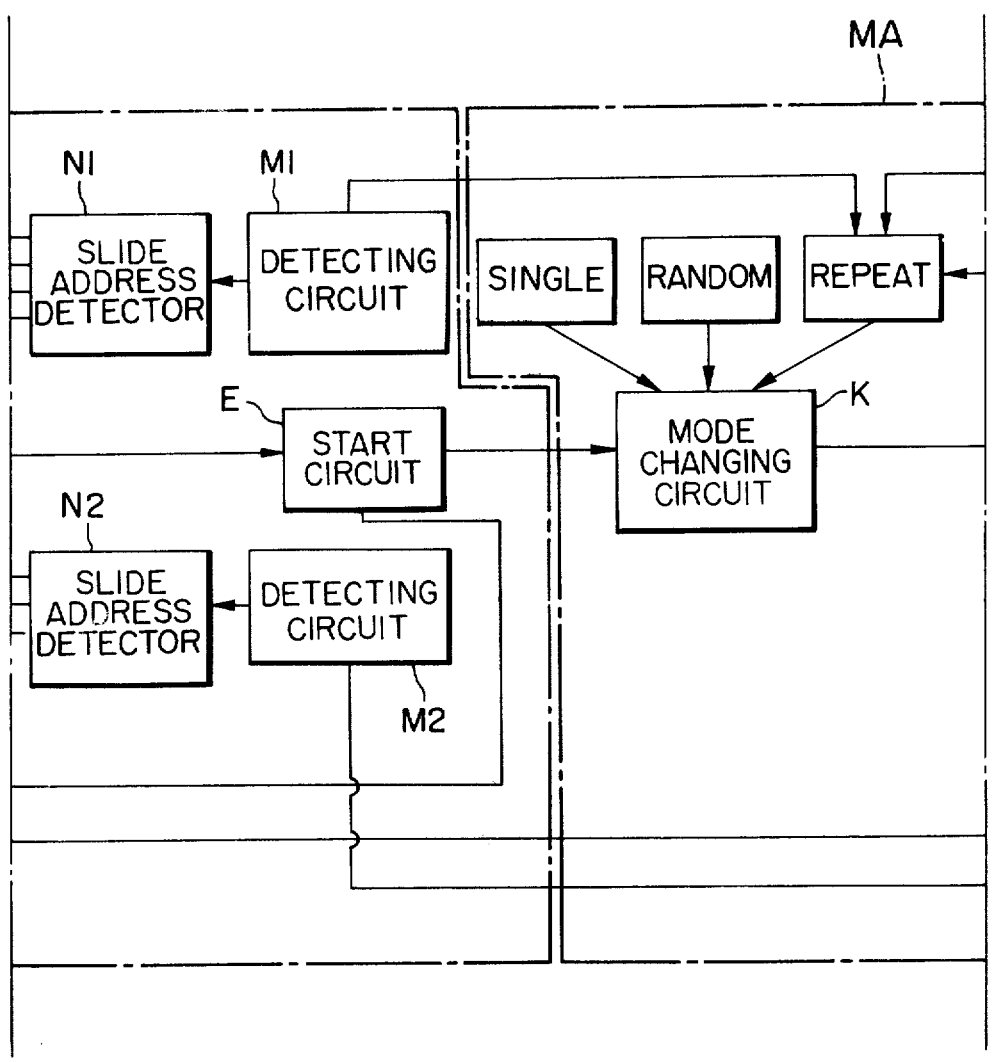
FIG. 1B is a block diagram of the detecting, start and mode changing circuits fitting together with the circuits of FIG. 1A.
Figure 1C:
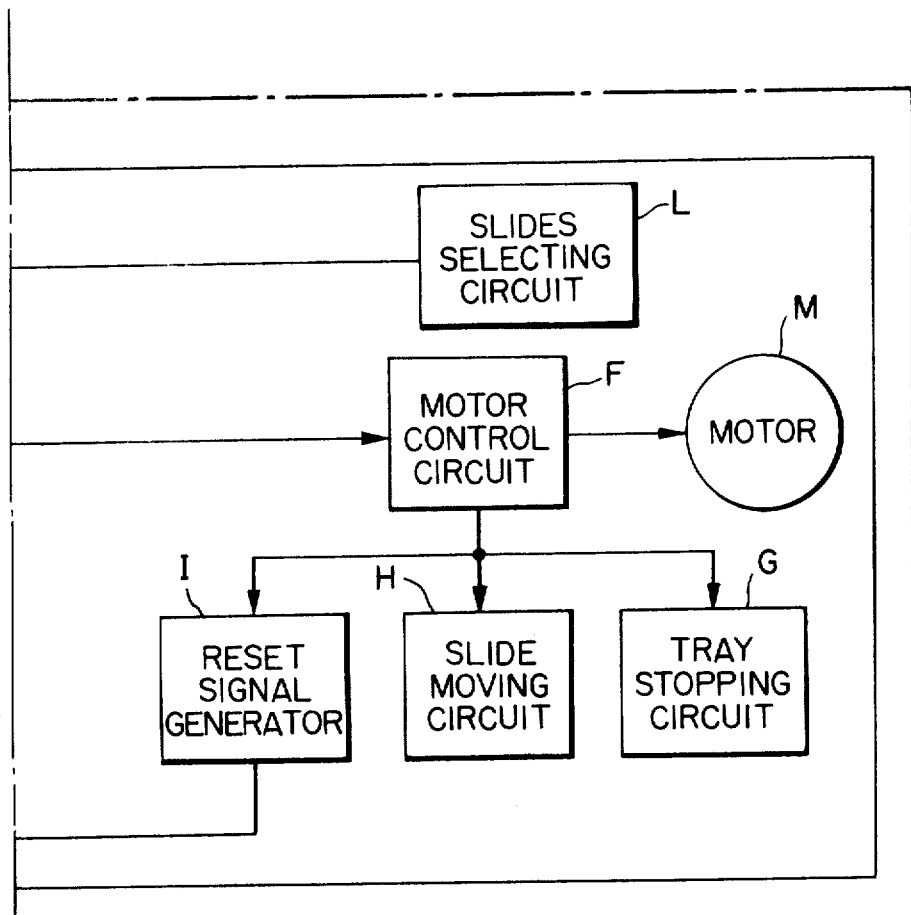
FIG. 1C is a block diagram of the slide selecting circuit and motor control and associated circuits of the embodiment of which the other circuits are illustrated in FIGS. 1A and 1B.
Figure 1C:
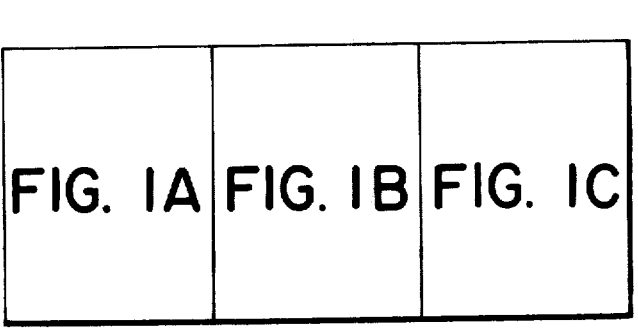

General Description, FIGS. 1A, 1B, 1C

First referring to FIGS. 1A, 1B and 1C, which fit together as indicated at the bottom of FIG. 1C, there is shown the block diagram of a slide film projector in accordance with the present invention, in connection with which the random access projection mode.

Switches S1-S9 are used to select the units digit of the address number of a slide film to be selected and projected, and switches S10-S50 are used to select the tens digit thereof. The address number of the slide film entered by the switches S1-S50 is encoded into coded signals by encoders A1 and A2 and stored in memory circuits B1 and B2. Detector circuits M1 and M2 detect the units and tens digits of the address of slide films in a slide tray or the like brought one by one to a slide film delivery position from which the slide film is to be delivered and placed in a projection position. In response to the output signals from the detecting circuits M1 and M2 slide address detectors N1 and N2 give the electrical signals representing the units and tens digits of the address of each slide film in turn to comparator circuits C1 and C2. The comparator circuits compare the output signals from the address detectors N1 and N2 with the signals stored in the memory circuits B1 and B2, respectively. The output signals from the comparator circuits C1 and C2 are synthesized in a circuit D. E designates a start circuit.

A projection mode selection switch K is switched to select the single slide film projection mode, the random access mode or the automatic repeat projection mode. A driving motor M is controlled by a control circuit F. A circuit G is adapted to engage a slide tray so as to stop accurately at a predetermined position, and a circuit H gives the signal in response to which a selected slide film is pushed out of the slide tray into the projection position. The circuits G and H are connected to the control circuit F together with a reset signal generator I. In response to the output signal from the reset signal generator I a reset circuit J applies the reset signals to the memory circuits B1 and B2.

When the repeat mode is selected by the mode selection switch K, the number of slide films to be projected repeatedly is set by a slide-film-number setting circuit L. O designates a start button; P, a reset button; MA, a block to be incorporated into the slide projector proper; and AT, an accessory block to be mounted on the projector proper. However, the blocks MA and AT may be disposed independently.

Next the general mode of operation of the control unit shown in FIG. 1 will be described briefly.

Random Access Projection Mode

The address number of a desired slide film is entered digit by digit by the switches S1-S50. That is, the units digit is set by one of the switches S1-S9 and the tens digit by one of the switches S10-S50. The signals thus set are encoded by the encoders A1 and A2 and are stored in the memory circuits B1 and B2.

The detecting circuits M1 and M2 detect the units and tens digits of an address of slide film advanced one by one into the delivery position, and the signals representing the numbers in the units and tens digits of the address are applied through the address detectors N1 and N2 to the comparator circuits C1 and C2 where they are compared with the signals stored in the memory circuits B1 and B2. The outputs of the comparator circuits C1 and C2 are synthesized in the synthesizing circuit D to be applied to the motor control circuit F.

In response to the depression of the start button O, a slide film in the projection position is returned into the slide tray and then the start circuit E is energized, but if there is no slide film in the projection position, the start circuit E is immediately energized. Thus the signal is applied to the input terminal of the motor control circuit F. As long as the output signals of either of the comparator circuits C1 and C2 is, that is so long as the signals representing the address of the slide film in the slide tray advanced into the delivery position do not coincide with the signals stored in the memory circuits B1 and B2, the motor M is kept driven so as to advance the slide tray. When the address of a slide film advanced into the delivery position coincides with the address selected and stored in the memory circuits B1 and B2, the comparator circuits C1 and C2 give the 0 output signals and then the motor M is stopped and gives the "motor-stop" signal. In response to the motor-stop signal, all of the circuits G, H and I are energized, and in response to the output signal from the reset signal generator I the reset circuit J is energized so as to reset the memory circuits B1 and B2, returning the control unit shown in FIG. 1 to its initial state.

Single Slide Film Projection Mode

When the single slide film projection mode is selected by the mode selection switch K, a button (not shown in FIG. 1) must be depressed so as to select the direction of advance of the slide tray and then a single slide film projection button is depressed. The motor M is driven so as to advance the slide tray step by step to bring the next slide film into the delivery position. In response to the motor stop signal the circuits G and H are energized so that the slide tray may be securely stopped and the selected slide film may be transferred into the projection position.

Repeat Projection Mode

When the repeat projection mode is selected by the mode selection switch K, a number of slide films to be repeatedly projected sequentially must be set into the slide film number setting circuit L. Then the slide tray is advanced step by step at a predetermined time rate (which is set by a timer to be described in detail hereinafter) so as to project sequentially a preset number of slide films. When the last slide film has been projected the slide tray is returned to the initial position in which the first slide film is ready to be projected again by a repeat mechanism. Thereafter the preset number of slide films are sequentially and repeatedly projected.

Figure 5:
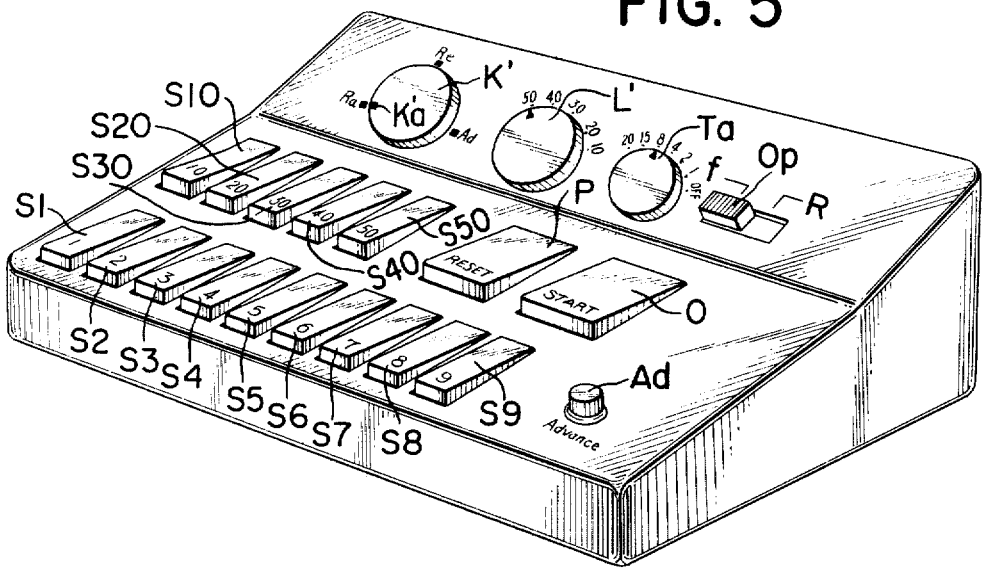
FIG. 5 is a perspective view of a control panel.

In FIG. 5 are illustrated the slide number selection switches S1-S50, the start button O, the reset button P and the like mounted on a control panel.

Driving Mechanism, FIGS. 2, 3, 4, 5 and 6

Figure 4:
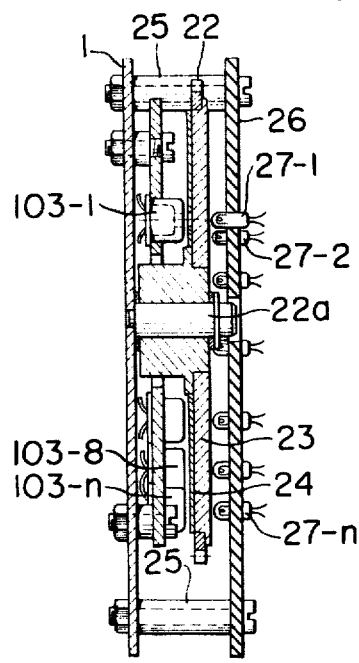
FIG. 4 is a cross sectional view looking in the direction indicated by the arrows IV—IV in FIG. 2.

Next referring to FIGS. 2, 3 and 4 the driving mechanism of the slide film projector in accordance with the present invention will be described hereinafter.

Figure 2:
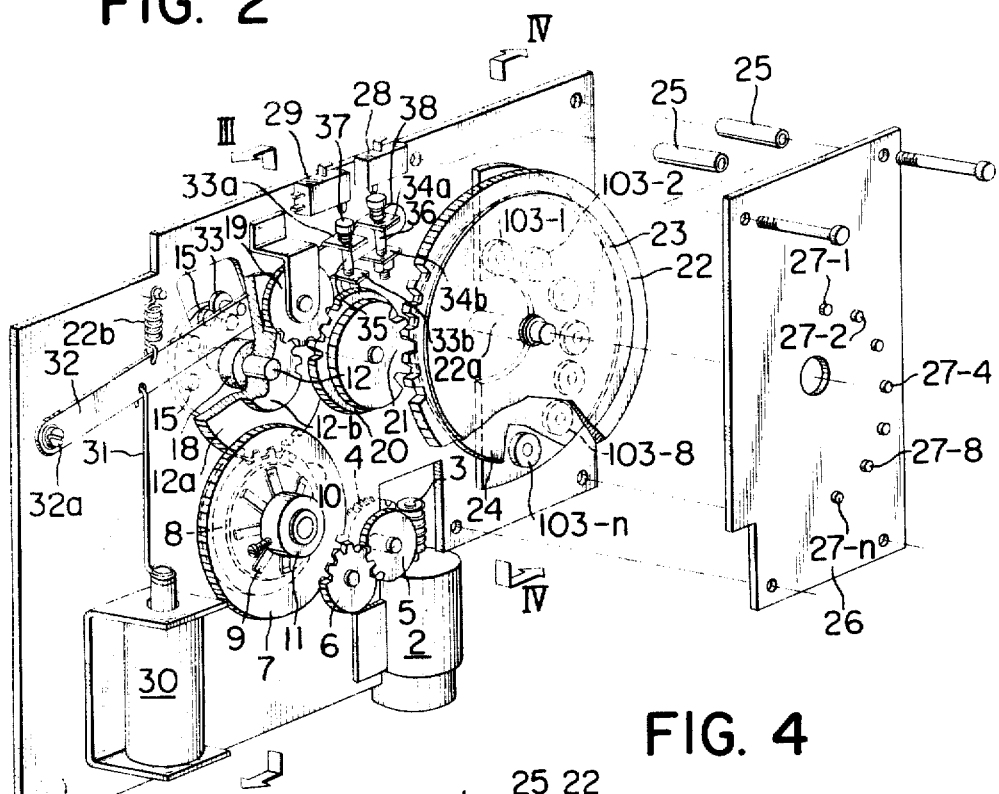
FIG. 2 is a perspective view illustrating a driving mechanism of the projector shown in FIG. 1.
Figure 3:
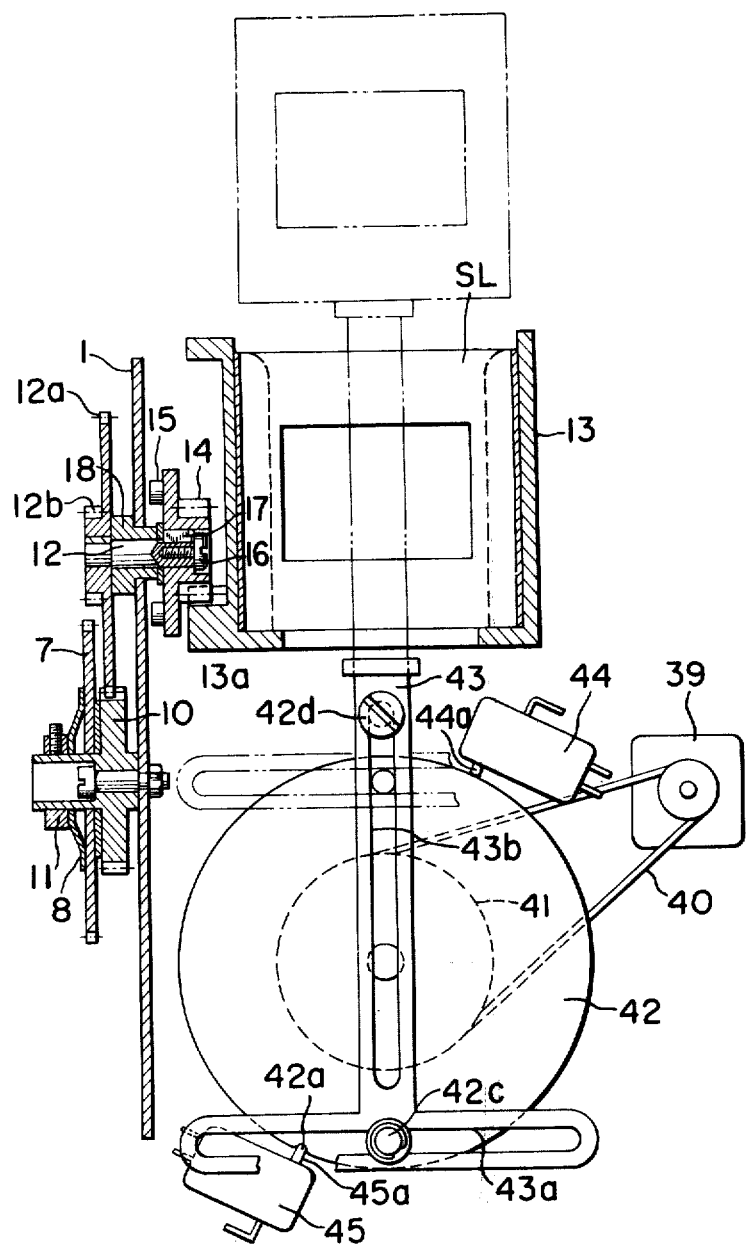
FIG. 3 is a cross sectional view taken along the line III—III of FIG. 2 illustrating the relation between the driving mechanism and a slide tray in which are stored a plurality of slide films.

Upon a mounting plate 1 (FIG. 2) is mounted a motor 2 which has a worm 3 mounted on a driving shaft thereof for driving a slide tray 13 (FIG. 3). The worm 3 (FIG. 2) is in mesh with a worm wheel 4 whose shaft carries a gear 5 in mesh with a idler gear 6 which in turn is in mesh with a gear 7. The gear 7 is pressed against a gear 10 coaxially carried by the shaft of the gear 7 through a friction disk 8 under the force of a spring 9 which may be adjusted by an adjusting knob 11.

Referring to FIG. 3, a slide tray 13 which holds a plurality of slide films in parallel slots arranged in a line perpendicular to the slots (linear parallel arrangement) has a rack 13a extending along one lower side thereof and in mesh with a pinion 14 which is mounted on a shaft 12 with a key 17 and with a setscrew 16 for preventing the pinion 4 from being pulled out of the shaft 12. The shaft 12 is rotatably supported by a bushing 18 securely fixed to the mounting plate 1 and carries large-diameter and small-diameter gears 12a and 12b in mesh respectively with the gear 10 and a gear 22, in the latter case through a train of gears 19, 20 and 21 (See FIG. 2).

Referring back to FIG. 2, the gear 22 is force fitted over a transparent disk 23 rotatably carried by a shaft 22a. On the back face of the transparent disk 23 is attached a code table 24 (See FIG. 6). It should be noted that the gear ratios among the gears 3, 4, 5, 6, 7, 10, 12a, 12b, 19, 20, 21 and 22 are so selected that there may be established the one-to-one correspondence between the numbers of slide films stored in the slide tray and the codes represented by the code table 24.

Figure 6:
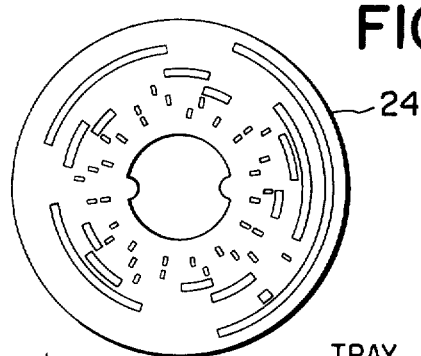
FIG. 6 is a top view of a code table used in a slide film position detecting mechanism.

Next to the slide address detecting means will be described with reference to FIGS. 2, 4 and 6 hereinafter. An insulating plate 26 which is disposed in spaced apart relation with respect to the transparent disk 23 by spacers 25 is provided with a plurality of light sources 27-1, 27-2, . . . and 27-n spaced apart from each other by a predetermined distance and extended through the insulating plate 26 as best shown in FIG. 4. Between the mounting plate 1 and the table code 24 attached to the transparent disk 23 are disposed a plurality of photoelectric cells 103-1, 103-2, . . . and 103-n in opposed relation with the light sources 27.

Referring back to FIG. 2, an electromagnetic plunger 30 which is securely held on the mounting plate 1 has a connecting rod 31 one end of which is connected to the plunger of the electromagnetic plunger 30 and the other end of which is fixed to a lever 32 pivoted with a pivot pin 32a to the mounting plate 1. The lever 32 which is normally biased so as to rotate in the counter clockwise direction by a spring 32b loaded between the lever 32 and the mounting plate 1 is provided with a roller 33 extending laterally of the lever 32 for engagement with two pins 15 out of a plurality of pins 15 extending from the rear face of the pinion 14 when the lever 32 is caused to rotate in the clockwise direction by the plunger 30. Therefore the slide tray 13 may be accurately and securely stopped at a predetermined position.

The lever 32 is further provided with two pairs of projections 33 and 34 bent at right angles relative to the lever 32 at the portions closer to the free end thereof, and pins 35 and 36 are supported by the two pairs of projections 33 and 34 respectively. The pins 35 and 36 have a knurled head and a threaded end, and are normally biased so as to move upwardly under the forces of springs 37 and 38 loaded between the heads of the pins and the projections for actuating switches 28 and 29. The positions of the pins 35 and 36 may be adjusted so as to adjust the timing for actuating the switches 28 and 29.

Referring back to FIG. 3 a mechanism for delivering a selected slide film SL out of the slide tray 13 into the projection position as indicated by the two-dotted chain lines will be described. A motor 39 is coupled by means of an endless belt 40 to a pulley 41 integral with a rotary disk or crank 42. An inverted-T shaped slide film lever 43 has elongated slots 43a and 43b formed in the base and leg thereof and respectively fitted over a pin 42c extending from the rotary disk or crank 42 and a guide pin 42d extending from a stationary member (not shown). The rotary disk or crank 42 is provided with a notch 42a which is adapted to engage with either of actuating members 44a or 45a of switches 44 and 45 held in position around the rotary disk 42.

FIG. 5 illustrates the control panel upon which are mounted in addition to the selection switches S1-S50, and the start and reset buttons O and P described above, a mode selection knob K', a knob L' for setting a number of slide films to be sequentially and repeatedly projected, a timer for setting a projection time Ta in case of the repeat projection mode, a switching button for selecting the direction $f$ (forward) or $r$ (rearward) of the advance of the slide tray 13, and an advance button Ad. The mode selection knob K' is so rotated as to coincide an index mark Ka' on the knob K' with markings Ad (Single Projection Mode), Ra (Random Projection Mode) or Re (Repeat Projection Mode).

Next the mode of operation of the driving mechanism as well as the slide film raising mechanism with the construction desired will be explained.

Random Access Mode

The mode selection knob K' is rotated to bring the index mark Ka' in registry with the mark Ra so as to select the random access mode. The timer knob Ta is rotated to OFF position, and then the address of a desired slide film, that is, of a storage chamber in the slide tray 13 is entered by the switches S1-S50 in the manner described hereinbefore. Upon depression of the start button O, the driving motor 2 starts to rotate so as to advance the slide tray 13 through the gear train 3, 4, 5, 6, 7, 10, 12a and 14 in mesh with the rack 13a of the slide tray 13. The rotation of the driving motor 2 is also transmitted through the gear train 12a, 12b, 19, 20, 21 and 22 to the rotary disk 23 so that the latter, to which is attached the code table 24, is rotated about the shaft 23a in synchronism with the advance of the slide tray 13. Light emitted from the light sources 27-1, 27-2, .. . and 27-n passes through the transparent rotary disk 23 so that the light rays which are not interrupted by the code table are intercepted by the photoelectric cells from 103-1 to 103-n. That is the coded signal representing the address of a storage slot in the slide tray 13 is received by the photoelectric cells 103 so that the address of slide film advanced to the delivery position immediately below the projection position may be detected. When the selected slide film is advanced to the delivery position immediately below the projection position, the electromagnetic plunger 30 is energized so that the lever 32 is caused to rotate in the clockwise direction against the spring 32b as the connecting rod 31 is moved downwardly. Therefore, the roller 33 engages with the two pins 15 of the pinion 14 in mesh with the rack 13a of the slide tray 13 so that the latter is held stationary. When the slide tray 13 is stopped, the electromagnetic plunger 30 is de-energized, but the driving motor 39 is kept energized so that the rotary disk or crank 42 is rotated through the endless belt 40 and the pulley 41. Therefore the slide film delivery or raising lever 43 is moved upwardly so as to lift and place the selected slide film into the projection position.

When the rotary disk 42 is not rotated, the switch 45 is normally opened because its actuating lever 45a is fitted into the notch 42a of the rotary disk 42 so that the slide tray 13 may be advanced in the manner described hereinbefore, but when the motor 39 is driven so as to rotate the rotary disk 42, the actuating lever 45a is pushed out of the notch 42a of the disk so that the switch 45 is closed. Therefore the driving motor 39 is kept energized until the notch 42a engages with the actuating lever 44a of the switch 44 so that the latter is opened. It should be noted that the switches 44 and 45 are positioned in diametrically opposed relation around the rotary disk 42 and that when the slide film raising or delivery lever 43 is caused to move upwardly during the rotation of the rotary disk 42 and hence the notch 42a through 180°.

The electronic control circuit for the random access mode will be described in detail hereinafter.

Single Projection Mode

The mode selection knob K' is rotated to select the index mark Ad, that is the single projection mode, and the direction setting button Op is set to $f$ or $r$. The timer knob Ta is kept in OFF position. In order to project the next slide film after one film has been projected, the advance button Ad must be depressed so that the slide tray 13 is advanced one step and the slide film is lifted and placed into the projection position in the manner described above.

Repeat Projection Mode

The mode selection knob K' is rotated to select the index mark Re, that is the repeat projection mode, and thereafter the number of slide films to be sequentially and repeatedly projected is entered by setting the knob L'. The projection time for each slide film is also set by the timer knob Ta. The selected slide films are sequentially projected one by one for a predetermined time, and when the last slide film has been projected, the slide tray 13 is returned to the initial position so that the selected slide films may be projected again beginning with the first slide film of the sequence.

Electronic Control Circuit, FIGS. 7A, 7B, 8A, 8B, 8C

Next the electronic control circuit for the single, random access and repeat projection modes of the slide projection in accordance with the present invention will be described.

Figure 7A:
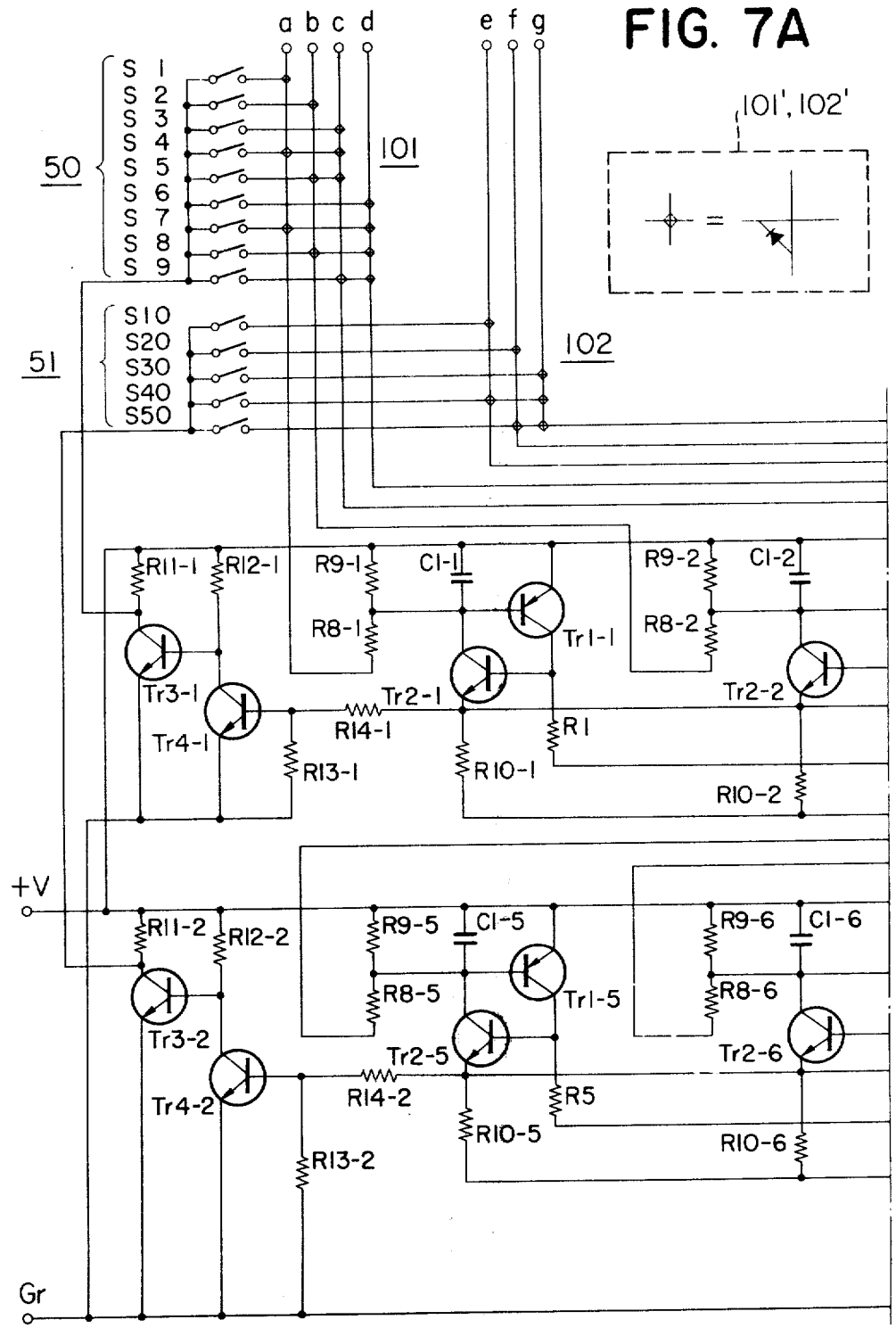

First referring to FIGS. 7A and 7B, which fit together as shown at the top of FIG. 7B, the control circuit including the encoders, memories and reset circuit will be described. The slide film address selection switches S1-S9 and S10-S50 are generally designated by 50 and 51, respectively. The encoders 101 and 102, which are designated by A1 and A2 in the block diagram shown in FIG. 1, comprise diode matrices the detail of which is shown at 101' and 102'. SR is a reset switch connected to the reset button P (See FIG. 5), and $l1—1$, a normally closed contact for a relay R/1 to be described hereinafter with reference to FIG. 8. Ri and Ci are resistors and capacitors (where $i = 1, 2, 3, \ldots i$); and Tr1-i and Tr2-i are pnp and npn transistors (where $i = 1 - 7$). In general the base of the transistor Tr1-i is connected to the collector of the transistor Tr2-i, and the collector of the transistor Tr1-i is connected to the base of the transistor Tr2-i. The emitter of the transistor Tr1-i is connected to a +V terminal. In cases $i = 1$ to 4 (incl.), the collector of the transistor Tr1-i is connected to a terminal A through a resistor Ri, and in cases $i = 5$ to 7 the collector of the transistor Tr1-i is connected to a terminal B through a resistor Ri. The base of the transistor Tr1-i is connected to the terminal +V through the capacitor C1-i and the resistor R9-i (where $i = 1 - 7$) and to the encoders 101 and 102 through the resistor R8-i.

In cases $i = 1$ to 4 the emitter of the transistor Tr2-i is connected to a common line through a resistor R10-i, and in cases $i = 5$ to 7 the emitter of the transistor Tr2-i is connected to a common line through a resistor R10-i and to the collector of an NPN transistor Tr5 whose base is connected to the collector of an NPN transistor Tr6. The collector of the NPN transistor Tr6 is connected to the terminal +V through a resistor R15. The emitters of the transistors Tr5 and Tr6 are connected to a terminal Gr which is grounded. The base of the transistor Tr6 is connected to the terminal Gr to the switch SR through a resistor R16. The base of the transistor Tr6 is also connected through a capacitor C2 to the normally closed contact $l1—1$, and to the terminal Gr through a resistor R18. The terminal C of the contact $l1—1$ is connected to the terminal +V. The emitters of the transistors Tr2-i ($i = 1 - 4$) are connected through a resistor R14-1 to the base of an NPN transistor Tr4-1 and to the terminal Gr through a resistor R13-1. The collector of the transistor Tr4-1 is connected to the terminal +V through a resistor R12-1 and to the base of a transistor Tr3-1, whose collector is connected to the terminal +V through a resistor R11-1 and to common terminals of the switches 50 and 51. The emitters of the transistors Tr2-i ($i = 5 - 7$) are connected through a resistor R14-2 to the base of an NPN transistor Tr4-2 and also to the terminal Gr through a resistor R13-2. The collector of the transistor Tr4-2 is connected to the base of a transistor Tr3-2 and to the terminal +V through a resistor R12-2. The collector of the transistor Tr3-2 is connected through a resistor R11-2 to the terminal +V and to the common terminals of the switches 50 and 51.

Mode of Operation

Next the mode of operation will be described. The address of a selected film slide is entered by pushing the switches in the switch groups 50 and 51 and is converted into the coded signals by the encoders 101 and 102. Then for example the base potential of the transistor Tr1-1 of the memory circuit comprising the transistors from Tr1-1 to Tr1-7 is dropped so that the transistor Tr1-1 is turned on and the collector potential, that is the voltage at the base of the transistor Tr2-1 is raised. Therefore the transistor Tr2-1 is turned on so that the collector potential thereof, that is the base potential of the transistor Tr1-1 is dropped. Under these conditions even when the switches in the switch group 50 is opened, both the transistors Tr1-1 and Tr2-1 remain turned on. Instead of the above transistor memory, any suitable memory may be employed comprising for example SCRs (silicon-controlled rectifiers), flip-flops or relays capable of remaining in one state until a signal is applied so that they are driven into the other state may.

When the transistor Tr1-i is turned on, some or all ends of the resistors R1-R7 are connected to the terminal +V so that the current flows to the common terminal A or B of the resistors R1-R7. The common terminals A and B are connected to the corresponding terminals A and B in the next stage shown in FIG. 8.

When the transistor Tr1-i is turned on the emitter potential of the transistor Tr2-i rises so that the base potential of the transistor Tr4-1 or Tr4-2 also rises. As a result the transistor Tr4-1 or Tr4-2 are turned on whereas the transistor Tr3-1 or Tr3-2 are turned off so that the common terminal of the switch bank 50 or 51 is disconnected from the terminal Gr. Therefore, even when the switch in the switch bank 50 or 51 is depressed, the base potential of the transistor Tr1-i remains unchanged. Thus, it is seen that the transistors Tr3-1 and Tr4-1 and Tr3-2 and Tr4-2 make up the protective circuits.

Normally the transistor Tr6 is off whereas the transistor Tr5 is on. Upon depression of the reset switch or when the contact $1—1$ is opened and then immediately closed, the positive pulse is applied to the base of the transistor Tr6 so that the latter is turned on during a predetermined time whereas the transistor Tr5 is turned off. Thus the transistors Tr1-i and Tr2-i are turned off. That is, the signals stored in the memory circuits are erased.

Figure 8A:
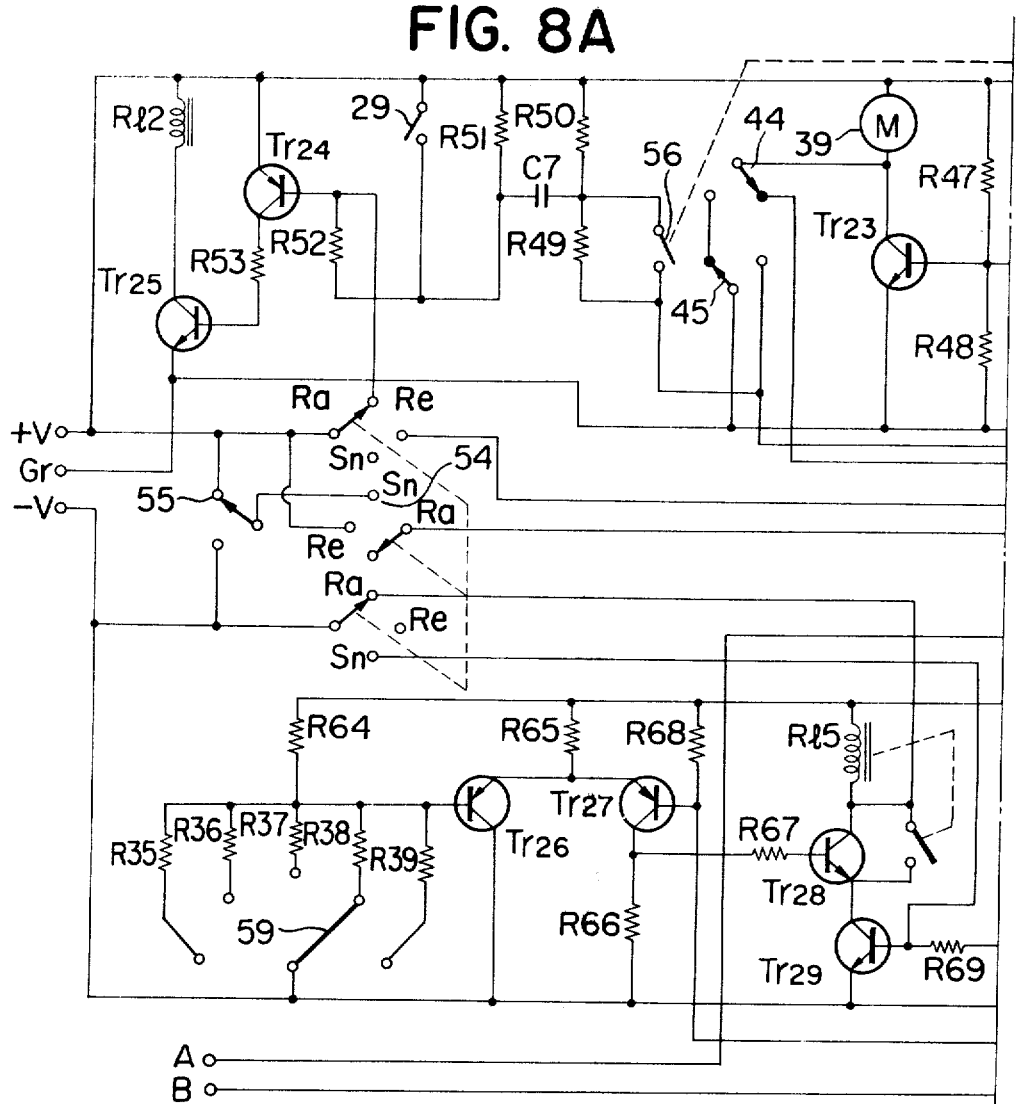
FIGS. 8A, 8B and 8C together whow the circuit diagrams of the electronic control circuits comprising the comparing and compound circuits of FIG. 1A and the various circuits shown in block diagram in FIGS. 1B and 1C.
Figure 8B:
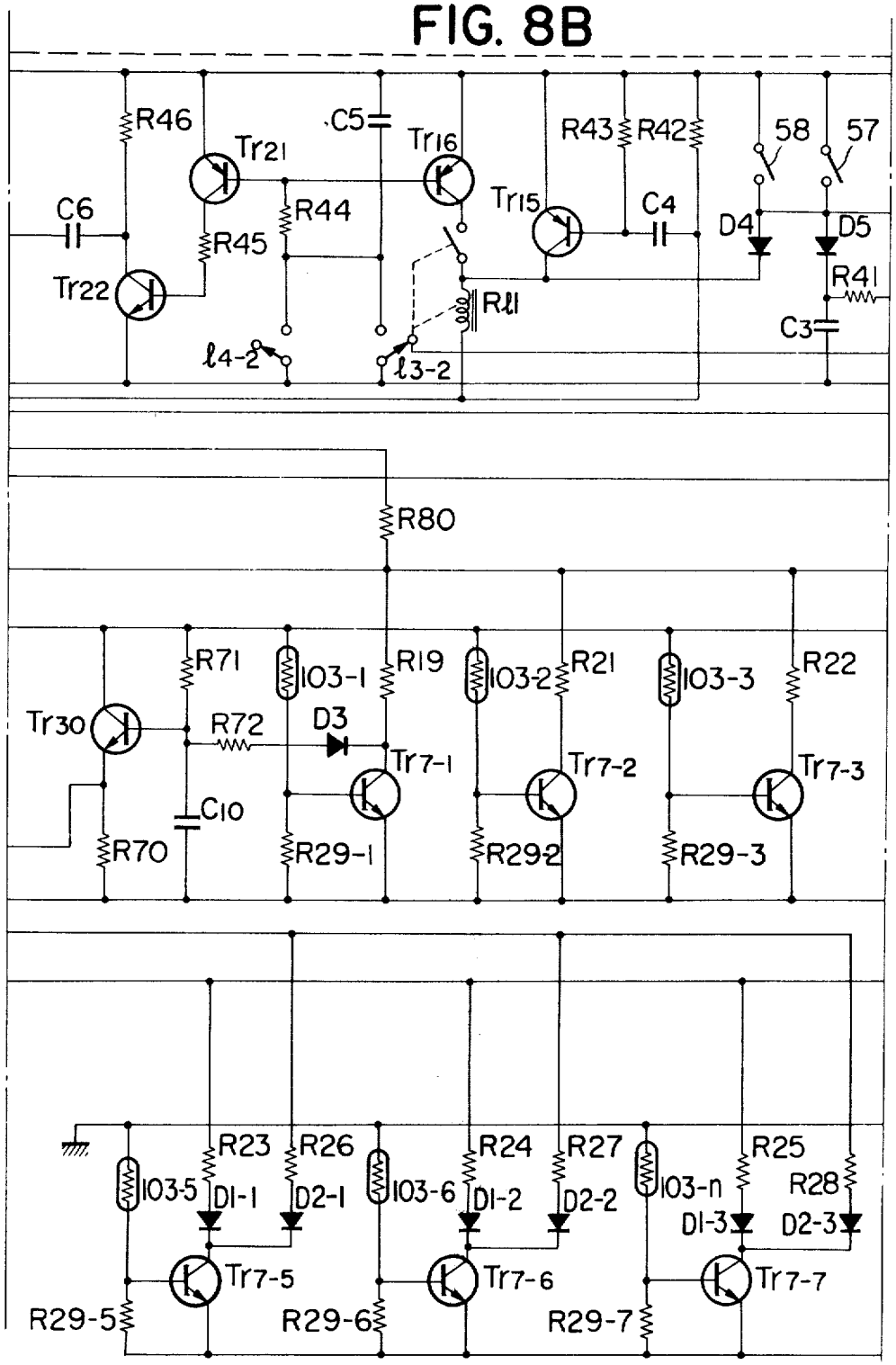
Figure 8C:
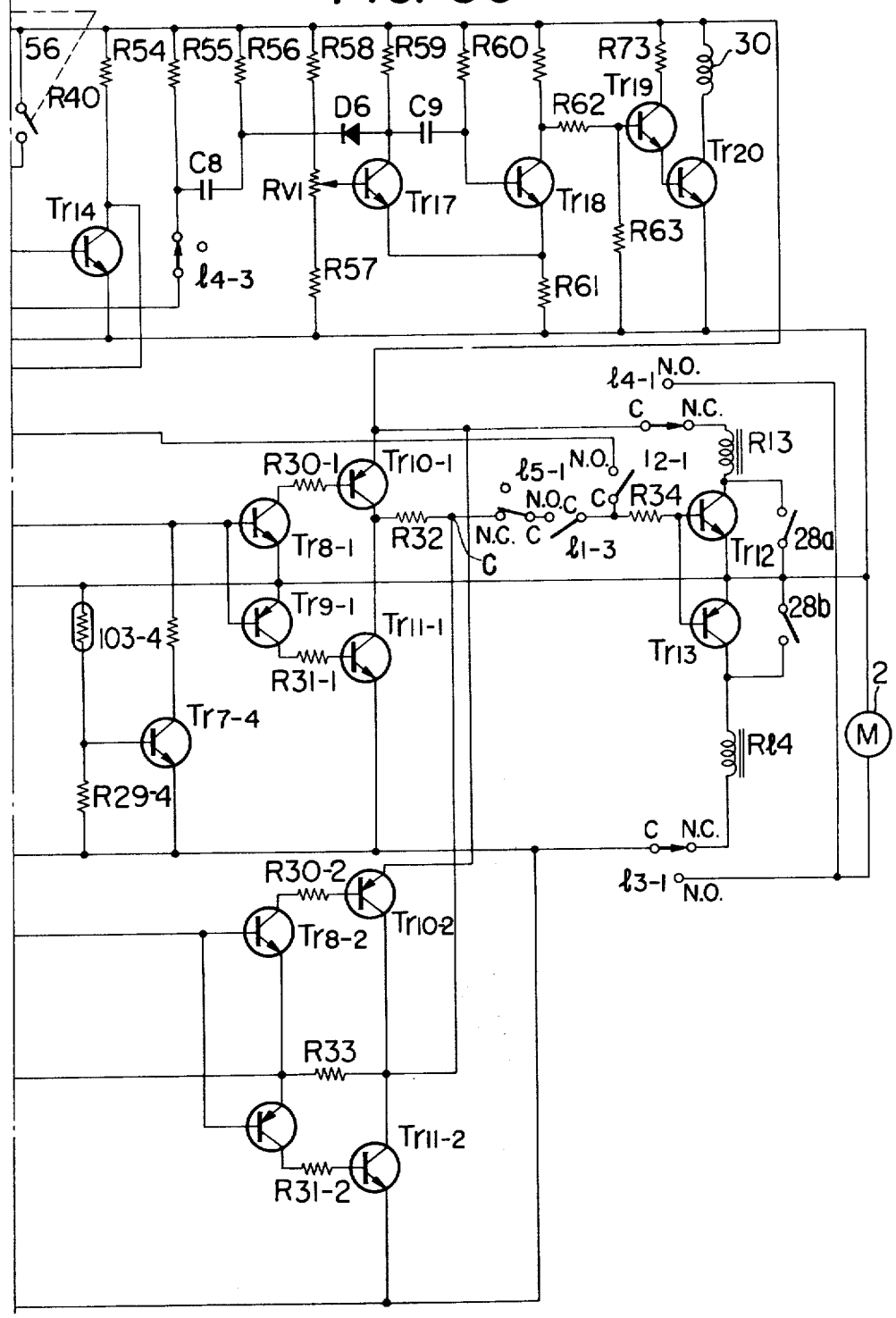

Control Circuit, FIGS. 8A, 8B and 9C

These figures fit together as shown at the bottom of FIG. 8A.

Next the electronic control circuit shown in FIG. 8 will be described in detail hereinafter. NPN transistors Tr7-m (where $m = 1 - 7$) have their bases connected to the terminal Gr through the photoelectric cells 103 m and to a terminal −V through resistors R29-m. The emitters of the transistors Tr7-m are connected to the terminals −V and the collectors are connected through resistors R19-R22 to the bases of an NPN and PNP transistors Tr8-1 and Tr9-1. The collectors of the transistors Tr7-m (where $m = 5 - 7$) are connected through diodes D-n ($n = 1 - 3$) and resistors R23, R24 and R25 to the bases of the transistors Tr8-2 and Tr9-2 and to the base of a pnp transistor Tr27 in a differential amplifier through diodes D2-n ($n = 1 - 3$) and resistors R26, R27 and R28. The emitters of the transistors Tr8-1 and Tr9-1 are connected to the terminals Gr.

When light is incident upon the photoelectric cells 103-m (where m = 1 – 4) the transistors Tr7-m connected thereto are turned on so that the current flows through the collectors thereof.

The base of a pnp transistor Tr10-1 is connected through a resistor R30-1 to the collector of the transistor Tr8-1, and the collector is connected to the collector of an npn transistor Tr11-1 and to the point C through a resistor R32. The emitter of the transistor Tr11-1 is connected to the terminal −V whereas the base is connected to the collector of the transistor Tr9-1 through a resistor R31-1. The emitters of the transistors Tr8-2 and Tr9-2 are grounded, and the emitter of a pnp transistor Tr10-2 is connected to the terminal +V whereas the base is connected to the collector of the transistor Tr8-2 through a resistor R30-2. The collector of the transistor Tr10-2 is connected to that of an npn transistor Tr11-2, to the point C and to the ground through a resistor R33. The emitter of the transistor Tr11-2 is connected to the terminal −V whereas the base is connected through a resistor R31-2 to the collector of the transistor Tr9-2.

The transistors Tr8-1 and Tr10-1, Tr8-2 and Tr10-2, Tr9-1 and Tr11-1, and Tr9-2 and Tr11-2 make up amplifiers, and depending upon the polarity of the signal applied to the common base, either of the transistor Tr10-k or Tr11-k (where k = 1 and 2) are saturated.

The common base of an npn transistor Tr12 and pnp transistor Tr13 is connected through a resistor R34, a normally open contact l1-3 of a relay l-1 and a normally closed contact l5-1 of a relay Rl5 to the point C. The emitters of the transistors Tr12 and Tr13 are connected to the terminal Gr. The collector of the transistor Tr12 is connected through a relay R/3, a normally closed terminal NC and a terminal C of a contact l4-1 of a relay R/4 to the terminal +V. The collector of the transistor Tr13 is connected through a relay Rl4 and the normally closed terminal NC and terminal C of a contact l3-1 for a relay R/3 to the terminal −V. The terminal C of the contact l1-3 is connected to the terminal C of the contact l2-1 of a relay R/2 through the normally closed terminal thereof and to the switch 54 (mode selection switch).

The collectors of the transistors Tr12 and Tr13 are connected to the terminal Gr through switches 28a and 28b.

One terminal of the motor M, which is designated by 2 in FIG. 2, is connected to the terminal Gr whereas the other terminal is connected to the normally opened terminals NO of the contacts l3-1 and l4-1. Therefore when the relay R/3 is energized so that its contact l3-1 is switched to the terminal connected to the terminal −V the motor M is rotated in the forward direction. Conversely when the relay R/4 is energized so that its contact l4-1 is switched to the terminal connected to the terminal +V the motor 2 is reversed in rotation.

An npn transistor Tr14 has a collector connected through a resistor R40 to the terminal +V and to a fixed contact of the switch 44 (See FIG. 3); a base connected through a resistor R41 and a capacitor C3 to the terminal Gr and through the resistor R41 and a diode D5 to the fixed contacts of switches 56, 57 and 58, the switch 58 being a timer switch and the switch 56 being a start switch.

An pnp transistor Tr15 has an emitter connected to the terminal +V, a base connected through a parallel connected circuit consisting of resistors R42 and R43 and a capacitor C4 to the terminal +V and through the capacitor C4 to the relay R/-1; and a collector connected to the relay R/1 and to its contact l1-2.

Two npn transistors Tr17 and Tr18 make up an oneshot multivibrator which is triggered by a signal from a differentiating circuit comprising resistors R54 and R55 and a capacitor C8 so as to give the positive pulse signal for a predetermined time. The pulse width may be varied by a variable resistor RV1. In response to the positive pulse from the monostable multivibrator transistors Tr19 and Tr20 in a Darlington circuit are turned on so that the electromagnetic plunger 30 (See FIG. 2) is energized for a predetermined time. The input to the differentiating circuit is applied when the contact l3-2 for the relay R/3 or the contact l4-2 for the relay R/4 is once opened and closed.

The bases of pnp transistors Tr16 and Tr21 are connected together to the terminal +V through a capacitor C5, and to the terminal Gr through a registor R44 and the contact l3-2 for the relay R/3 or the contact l4-2. The collector of the transistor Tr16 is connected to the contact l1-2, and the emitters of the transistors Tr16 and Tr21 are connected to the terminal +V. The collector of the transistor Tr21 is connected through a resistor R45 to the base of an npn transistor Tr22, whose emitter is connected to the terminal Gr. The collector of the transistor Tr22 is connected through a resistor R46 to the terminal +V, and through a capacitor C6 to the base of an npn transistor Tr23 which is so biased through resistors R47 and R48 as to be normally turned on. The collector of the transistor Tr23 is connected to the motor 39 and to the switch 45 (See FIG. 3) whereas the emitter is connected to the terminal Gr.

The relay R/1 is connected to the switch 45, the start switch 56 and to a resistor R49 which in turn is connected through a resistor R50 to the terminal +V, and to the base of a transistor Tr24 through a capacitor C7 and a resistor R52. The transistor 24 has a base connected to the terminal +V through the resistor R52 and a switch 29 and to the mode selection switch 54, and has a collector connected through a resistor R53 to the base of a transistor Tr25. The emitter of the npn transistor Tr25 is connected to the terminal Gr whereas the collector is connected to a relay R/2.

The terminal A is connected through a resistor R80 to the mode selection switch 54. An npn transistor Tr30, which is an emitter follower, transmits the signal when the emitter potential of the transistor Tr7-1 drops, that is when the transistor Tr7-1 is turned on. When the emitter potential of the transistor Tr30 drops, the transistor Tr29 is turned off. The transistor Tr29 makes up an AND circuit together with a transistor Tr28. Therefore when both transistors Tr28 and Tr29 are turned on, the relay Rl5 is energized.

Transistors Tr26 and Tr27 make up a differential amplifier, and the base of the transistor Tr26 is baised to a predetermined potential by a resistor R64 and one of resistors R35-R39.

Random Access Projection Mode

Next the mode of operation will be described when the projection mode selection switch 54, which is designated by K in the block diagram in FIG. 1, is switched to the terminals Ra for selecting the random access projection mode.

The base of the transistor Tr24 is connected to the terminal +V so that the transistors Tr24 and Tr25 are turned off. Therefore the relay R/2 is de-energized. Since one terminal of the relay R/5 is connected to the terminal −V, it is also de-energized.

The position of the slide tray 13 is converted into the coded signals by the code table 24 which in turn are converted into the electrical signals by the photoelectric cells from 103-1 to 103-n. Instead of the code table 24, magnetically sensitive elements, reed switches or the like may be used in order to detect the position of the slide tray 13.

When the light ray is incident upon the photoelectric cell, the transistor Tr7-m is turned on so that one or a combination of the resistor R19-R25 are connected to the terminal −V so that the current flows from the terminal A or B. The potential at the terminal A or B is dependent upon the resistances of the resistors R1-R7 connected to the power source +V or of the resistors R19-R25 connected to the power source −V. The terminals A and B are equal in potential only when the resistances between the terminals A and B and the power source +V are equal. That is, the voltage difference between the terminals A and B is zero (0).

When the terminals A and B are both at a positive potential, both the transistors Tr8 and Tr10 are turned on so that the potential at the point C becomes positive (+). When the potential at one of the terminals A and B is positive whereas the potential at the other terminal is negative, the positive potential, that is the potential at the terminal B appears at the point C because the resistor 32 is inserted between the point C and the transistor Tr10-1.

It is assumed that the slide tray 13 must be advanced in order to select a desired slide film. In this case the potentials at the terminals A and B are both positive so that the transistors Tr8 and Tr10 are turned on. As a result the positive potential (+) appears at the point C.

In response to the depression of the start switch 56, designated by 0 in FIG. 5, the transistor Tr14 is turned on so that the current flows from the power source +V to the motor 39 through the switch 44 and the transistor Tr14 when a slide film is in the projection position. As a result the motor 39 rotates so that the switch 44 is opened while the switch 45 is closed (See FIG. 3). Therefore even when the start switch 56 is released, the motor 39 remains energized. After the projection the slide film is returned into the slide tray 13 and the switch 45 is opened so that the transistor Tr15 is turned on for a predetermined time and the relay R/1 is energized.

When the slide film is in the slide tray, the switch 45 is closed so that the relay R/1 is energized. Then the relay R/1 is energized, the contacts l1−1, l1−2 and l1−3 are switched.

Since the relay R/5 is energized as described above, when the contact l1-3 is switched, the potential at the point C is impressed to the bases of the transistors Tr12 and Tr13 through the contacts l5-1 and l1-3 and the resistor R34 so that the transistor Tr12 is turned on. Therefore the relay R/3 is energized so that the contacts l3-1 and l3-2 are switched and the motor 2 rotates in the forward direction in order to advance the slide tray 13.

Figure 9:
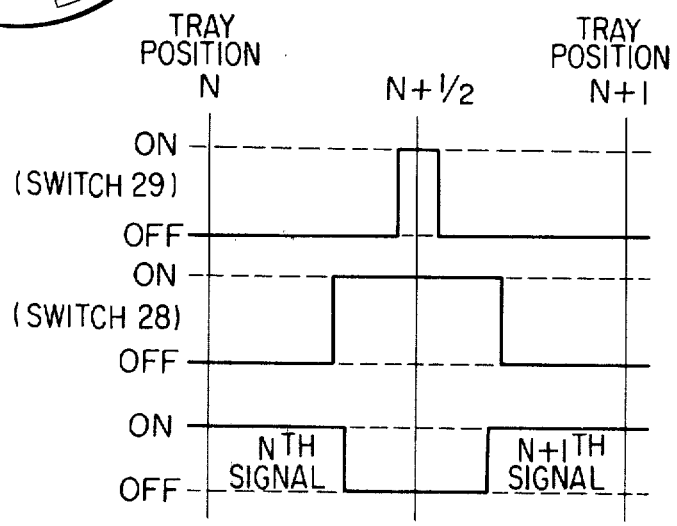
FIG. 9 shows a timing chart used for the explanation of a slide tray stopping mechanism.

As the slide tray 13 is advanced the switches 28 and 29 (See FIG. 2) are closed and opened as shown in the timing chart in FIG. 9. When the switch 28 is closed, the contacts 28a and 28b are closed and the relay R/3 is self-held so that the motor 2 may be kept energized. The above operation is accomplished in order to detect the signal representing the position or address of the slide tray 13 in synchronism with the code table 24.

As the slide tray 13 is advanced the code table 24 is rotated so as to detect the position of the slide tray 13. Depending upon the position of the slide tray 13, some of the photoelectric cells intercept the light rays from the light sources but others do not so that the resistances of the combination of resistors R19-R22 and of the combination of resistors R23-R25 are varied. But when the address of a slide in the delivery position coincides with the address of the slide film selected, the resistance of the combination of resistors 1–4 becomes equal to that of the combination of resistors R19-R22. Similarly the resistance of the combination of resistors 5–7 becomes equal to that of the combination of resistors R23-R25. As a result the potentials at the terminals A and B become both zero (0), and the transistors Tr8-1, Tr10-1, Tr8-2 and Tr10-2 are turned off. The potential at the point C becomes zero (0) so that the transistor Tr12 is turned off and the relay R/3 is de-energized. Thus the motor 2 is de-energized.

When the relay R/3 is de-energized the contact l3-2 is switched the trigger signal is applied through the capacitor C8 and the diode D6 to the one-shot multivibrator comprising the transistors Tr17 and Tr18. Therefore the pulse appears for a predetermined time from the collector of the transistor Tr18 and is applied to the Darlington circuit so that the transistors Tr19 and 20 are turned on. Then the electromagnetic plunger 30 is energized.

Since the contact l3-2 is switched, the capacitor C5 is discharged so that the transistors Tr16 and Tr21 are turned off after a predetermined time. Since the transistor Tr16 is turned off, the relay R/1 is de-energized so that its contacts l1−1, l1−2 and l1−3 are switched. Thus the memory is erased.

Repeat Projection Mode

The mode selection switch 54 is switched to the Re contacts, for selecting the repeat projection mode. Next the repeat switch 59 is set depending upon a number of slide films to be sequentially and repeatedly projected, and the timer switch 58 is closed. So long as all of the selected slide films are not yet projected the timer switch 58 is intermittently closed at a predetermined interval so that the transistor Tr14 is turned on so as to return the film slide from the projection position into the slide tray 13 in the manner described hereinbefore. Since the switch 45 is closed, the negative pulse is applied through the resistor 49, the capacitor C7 and the resistor R52 to the transistor Tr24 so that the latter is turned on for a predetermined time duration (until the switch 29 is closed so that the capacitor C7 is discharged). Since the transistor Tr24 is turned on, the transistor Tr25 is also turned on so that the relay R/2 is energized. Therefore the contact l2-1 is switched so that the current flows through the resistor R34 into the base of the transistor Tr12. As a result the transistor Tr12 is turned on so that the relay R/3 is energized and the contacts l3-1, l3-2 and l3-3 are switched. The motor 2 is driven in the forward direction so that the slide tray 13 is advanced through the gear train (See FIGS. 2 and 3). As shown in the timing chart in FIG. 9, when the slide tray is advanced by one half step the switch 29 is closed so that the capacitor C7 is discharged. As a result the relay R/2 is de-energized. Thereafter the relay R/3 remains energized because the switch 28 is closed until the slide tray 13 is advanced by one step, and the motor 2 is also kept energized. When the slide tray is advanced by one step, switch 28 is opened and the relay R/3 is de-energized so that the electromagnetic plunger 30 is energized so as to push the slide film into the projection position. The above operation is cycled until the slide films entered by the repeat switch 59 have all been projected.

One input to be applied to the differential amplifier (Transistors Tr26 and Tr27) is a voltage divided by the resistor R64 and one of the resistors in the repeat switch 59, and the other input is a voltage divided by the resistor R68 and the resistors R26-R28 which represent the number of slide films to be projected sequentially. When the two inputs are equal the collector potential of the transistor Tr27 rises so that the transistor Tr28 is turned on to energize the relay R/5. Once the relay R/5 is energized its contacts l5-1 and l5-2 are switched so that the relay R/5 may be self-held and the potential at the point C is applied to the bases of the transistors Tr12 and Tr13. Even though the potential at the terminal A is positive because the terminal A is connected through the resistor R80 to the power source +V, the potential at the point C becomes negative (−) because the potential at the terminal B is negative (−). Therefore the transistor Tr13 is turned on and the relay R/4 is energized so that the motor 2 is reversed in rotation until the resistance of the resistor 80 becomes equal to the resistance exhibited when the slide tray 13 is returned to the initial position. Then the electromagnetic plunger 30 is energized so as to push the slide film upwardly into the projection position. When the resistance representing the first slide film is that of the resistor R19, the transistor Tr7-1 is turned on when the motor 2 is stopped so that the base potential of the transistor Tr30 is zero and the transistor Tr29 is turned off. Therefore the relay R/5 is not self-held any longer. Thereafter the slide tray is advanced step by step.

Single Projection Mode

When the mode selection switch 54 is switched to the single projection mode Sn, the relay R/5 is always de-energized. By the direction selection switch Op (See FIG. 5) positive or negative potential (+) or (−) is applied to the bases of the transistors Tr12 and Tr13 as in the case of the repeat projection mode so that the motor 2 drives the slide tray one step forward or backward.

As described above according to the present invention the projector can be readily switched from the random access mode to the repeat mode, and vice versa. Therefore when the present invention is applied to a slide projector the slide film in the slide tray may be quickly and correctly selected and projected.

We claim:

1. A slide film projecting system capable of random access projection comprising:
   a. slide film holding means for holding a plurality of slide films;
   b. drive means operative upon energization to drive said slide film holding means along a predetermined path to a slide delivery position where a selected slide film can be set for projection;
   c. detecting means for detecting the address of the one of said slide films located in said slide delivery position during the operation of said drive means to produce an electrical signal representing the detected address of the slide film in the delivery position;
   d. selector means for inputting a digital signal representing an address of a desired slide film for random access projection, said selector means comprising at least one array of switching members each having one terminal connected to a common connection and being arranged to connect said common connection to one or more code busses which are fewer in number than the switching members of one of said array, and
   e. control circuitry connected to said drive means for actuating said drive means to place the desired slide film into the slide delivery position, said circuitry comprising a plurality of signal holding means each individual to one of said code busses, said signal holding means being operable to hold the electrical signal produced by the selector means during a complete operation of said driving means irrespective of the operating condition of said switching members after said switching members were once operated.

2. A slide film projecting system as set forth in claim 1, wherein said control circuitry further includes comparator means coupled to said detecting means and said signal holding means for electrically comparing the signals both from the detecting means and the signal holding means to produce a control signal corresponding the difference between said both signals.

3. A slide film projecting system as set forth in claim 1, wherein said control circuitry further includes means for resetting the signal holding means in response to the comparator means when the control signal from the comparator means becomes substantially zero.

4. A device for automatically selecting a desired slide film out of a plurality of slide films and projecting said selected slide film comprising:
   a. a slide holder for holding a plurality of slide films;
   b. drive means operative upon energization to drive said slide holder along a predetermined path including a slide film delivery location;
   c. detecting means for detecting the address of a slide film in said slide film delivery location during the operation of said drive means, said detecting means including a plurality of digital signal generating means operative to intermittently produce a digital signal in response to the detecting operation, the digital signal produced by each of said signal generating means, per se or in combination with other digital signals being representative of the address of said slide within said film delivery location;
   d. selector means for inputting a digital signal representing an address of a desired slide film for random access projection, said selector means comprising at least one array of switching members each having one terminal connected to a common connection and being arranged to connect said common connection to one or more code busses which are fewer in number than the switching members of one of said array;

e. a first converter means coupled to an output of said digital signal generating means for converting the digital signal therefrom to an electrical current signal;

f. second converter means connected to said busses for converting the digital signals thereon to an electrical current signal, said second converter means comprising a converter circuit for each of said code busses and means for combining the outputs of the converter means connected to the code busses associated with each array of switching members of said selector means, and g. comparator means connected to the outputs of said first converter means and said second converter means for comparing the respective amounts of current thereof to produce a control signal corresponding the difference between said respective converter output currents for controlling the energization of said drive means.

5. A device as set forth in claim 4, wherein said selector means includes signal holding means operable in response to the inputting operation of said selector means.

6. A device as set forth in claim 4, wherein said selector means includes a first array of switching members for selecting the units digit of a slide film address number and a second array of switching members for selecting the ten digit of the slide film address number.

7. A slide film projecting system capable of slide film-selection projection comprising in combination:

a. slide holding means for holding a plurality of slide films for selection of a desired slide film;

b. drive means operative upon energization to drive said slide holding means along a predetermined path to a predetermined position for a slide film changing location;

c. slide changing means operative upon energization to move a slide film along a predetermined path between the slide film changing location and a slide film projection location, and d. control circuitry coupled to said drive means and said slide changing means for controlling sequentially operation of said drive means and said slide changing means, said circuitry including means operable upon deenergization of said drive means to delay the actuation of said slide changing means after the deenergization of said drive means thereby to secure the slide changing operation after the stoppage of said drive means.

8. A slide film projection system as set forth in claim 7, wherein said delaying means includes a detecting circuit member for detecting the deenergization of the drive means and for producing a delaying signal and a delay circuit member operable for delaying the actuation of the slide changing means for a predetermined internal in response to the delaying signal.

9. A slide film projector system as set forth in claim 7, wherein said delaying means includes a differential circuit for producing a triggering signal for actuating the slide changing means and a delaying circuit for delaying the triggering signal producing for a predetermined time interval after the deenergization of the drive means.

10. A combination of a slide film projector and a control device therefor comprising:

a. means for storing therein a plurality of slide films in a linear parallel arrangement;

b. driving means for moving said slide film storage means linearly with reference to a projection position for selectively placing a slide film in a delivery position adjacent said projection position;

c. means for selectively displacing a slide film rectilinearly edgewise from said delivery position into said projection position, said displacing means applying force perpendicular with respect to the direction of linear arrangement of said slide films in said storage means and being arranged to advance said slide film to the delivery position in separate movements;

d. random access projection means including first selection signal input means for selecting one of said plurality of slide films in said storage means for movement by said driving means into the delivery portion;

e. automatic repeat projection means including second selection signal input means for projecting sequentially and repeatedly a sequence of an arbitrary number of slide films selected from said plurality of slide films in said storage means, and including also control means for returning said driving means to the position in which the first slide film of said arbitrarily selected slide films is to be projected again in response to the signal from said second mentioned selection signal input means after the last slide film of said sequence has been projected, and f. projection mode selection means for switching from the random access projection mode to the automatic repeat projection mode, and vice versa.

11. A combination of a slide film projector and a control device therefor as set forth in claim 10, wherein the advance and return movements of said displacing means is produced by actuating means actuatingly coupled with second driving means, said second driving means being arranged to be controlled through second switching means providing normally closed paths for alternate operations of said second driving means, such that the opening of one of said paths terminates the operation of said second driving means and prepares the other of said paths for a subsequent operation of said second driving means.

12. A combination of a slide film projector and a control device therefor as set forth in claim 11, wherein said actuating means consists of a rotary disk, on which is provided a second control means for on-off control of said second switching means.

13. A combination of a slide film projector and a control device therefor as set forth in claim 11, wherein said second control means is arranged to deactivate said second switching means when said displacing means reaches either an uppermost position or a lowermost position.

14. A combination of a slide film projector and a control device therefor as set forth in claim 10, wherein said random access projection means includes means for detecting the address of a slide film in said slide film delivery position.

15. A combination of a slide film projector and a control device therefor as set forth in claim 14, wherein said detecting means comprises potential information registering means and means for reading out the registered information on said positional information registering means.

16. A combination of a slide film projector and a control device therefor as set forth in claim 15, wherein said reading out means comprises an arrangement in which photoelectric converting means and light sources are provided respectively in symmetrical relation with respect to said positional information registering means.

17. A combination of a slide film projector and a control device therefor as set forth in claim 15, wherein said random access projection means is electrically connected to said first selection signal input means and to said detecting means for controlling the drive and the stop of said driving means in response to the difference between the outputs of said first selection signal input means and said detecting means.

18. A combination of a slide film projector and a control device therefor as set forth in claim 15, wherein said random access projection means comprises memory means for storing the output signal from said first selection signal input means.

19. A combination of a slide film projector and a control device therefor as set forth in claim 18, wherein said random access projection means comprises means for erasing the memory stored in said memory means.

20. A combination of a slide film projector and a control device therefor as set forth in claim 10, wherein said automatic repeat projection means includes means for detecting the address of a slide film in a slide film delivery position from which said film is to be displaced into the projection position.

21. A combination of a slide film projector and a control device therefor as set forth in claim 20, wherein said automatic repeat projection means comprises comparator means electrically connected to said first selection input means and to said detecting means for controlling the drive and the stop of said driving means in response to the difference between the outputs of said first selection signal input means and said detecting means.

22. A combination of a slide film projector and a control device therefor as set forth in claim 21, wherein said comparator means comprises a transistorized differential amplifier.

23. A combination of a slide film projector and a control device therefor as set forth in claim 10, wherein said automatic repeat projection means comprises timer means for setting a projection time for said slide film.

24. A combination of a slide film projector and a control device therefor as set forth in claim 10, wherein said projection mode selection means comprises a selection member for sequentially bringing the slide films one by one into said delivery position.

25. A device for automatically selecting a slide film out of a plurality of slide films stored in a tray and projecting said selected slide film comprises:

a. a tray for storing therein a plurality of slide films in a linear parallel arrangement and advancing them to a slide film delivery position from which said selected slide film is to be displaced into a projection position, said tray being arranged for linear advance to said slide film delivery position;

b. driving means for advancing said tray step by step to said slide film delivery position;

c. means for displacing said selected slide film rectilinearly from said slide film delivery position into said projection position and back, said displacing means applying a force edgewise to said slide film and perpendicular to the direction of linear arrangement of slide films in said tray;

d. means operatively coupled to said driving means for identifying, by its position in said tray, a slide film in said slide film delivery position;

e. selection signal input means for selecting a single slide film to be projected;

f. first comparator means electrically coupled to said identifying means and to said selection signal input means for actuating said driving means in response to the difference between the outputs of said selection signal input means and said detecting means;

g. projection mode switching means for switching between the random access projection mode and the automatic repeat projection mode;

h. means operatively coupled to said projection mode switching means for interrupting random access projection, thereby deactivating said selection signal input means;

i. automatic repeat projection programming means for inputting information representing a sequence of slide films to be sequentially and repeatedly projected;

j. means for detecting the last slide film of said sequence of slide films selected by said programming means;

k. means responsive to said detecting means for returning said tray to a position in which said first slide film is again in said delivery position, and l. second comparator means coupled to said identifying means and said programming means for actuating said driving means in response to the difference signal between the outputs of said identifying means and a sequential portion of said programming means in succession.

26. A device for automatically selecting a slide film out of a plurality of slide films stored in a tray and projecting said selected slide film as set forth in claim 25, wherein said driving means includes means for changing the direction of the movement of said slide film storage means.

27. A device for automatically selecting a slide film out of a plurality of slide films stored in a tray and projecting said selected slide film as set forth in claim 25, wherein the advance or return movement of said displacing means is caused by actuating means actuatingly coupled with second driving means, said second driving means being controlled through second switching means providing normally closed paths for alternate operations of said second driving means, such that the opening of one of said paths terminates the operation of said second driving means and prepared the other of said paths for a subsequent operation of said second driving means.

28. A device for automatically selecting a slide film out of a plurality of slide films stored in a tray and projecting said selected slide film as set forth in claim 27, wherein said actuating means consists of a rotary disk.

on which control means for on-off controlling said second switching means is provided.

29. A device for automatically selecting a slide film out of a plurality of slide films stored in a tray and projecting said selected slide film as set forth in claim 27, wherein said control means is arranged for deactivation of said second switching means when said displacing means reaches either an uppermost position or a lowermost position.

30. A device for automatically selecting a slide film out of a plurality of slide films stored in a tray and projecting said selected slide film as set forth in claim 25, wherein said identifying means includes means for identifying the address of a slide film in said slide film delivery position.

31. A device for automatically selecting a slide film out of a plurality of slide films stored in a tray and projecting said selected slide film as set forth in claim 20, wherein said identifying means comprises positional information registering means and means for reading out the information registered on said positional information registering means.

32. A device for automatically selecting a slide film out of a plurality of slide films stored in a tray and projecting said selected slide film as set forth in claim 31, wherein said reading out means comprises the arrangement at which photoelectric converting means and light sources are provided respectively in symmetrical with respect to said positional information registering means.

33. A device for automatically selecting a slide film out of a plurality of slide films stored in a tray and projecting said selected slide film as set forth in claim 30, wherein said first comparator means is electrically connected to said selection signal input means and to said identifying means for controlling the drive and the stop of said driving means in response to the difference between the outputs of said selection signal input means and said detecting means.

34. A device for automatically selecting a slide film out of a plurality of slide films stored in a tray and projecting said selected slide film as set forth in claim 30, wherein memory means are provided for storing the output signal from said selection signal input means.

35. A device for automatically selecting a slide film out of a plurality of slide films stored in a tray and projecting said selected slide film as set forth in claim 34, wherein means are provided for erasing the memory stored in said memory means.

36. A device for automatically selecting a slide film out of a plurality of slide films stored in a tray and projecting said selected slide film as set forth in claim 25, wherein said first and second comparator means respectively comprise transistorized differential amplifiers.

37. A device for automatically selecting a slide film out of a plurality of slide films stored in a tray and projecting said selected slide film as set forth in claim 25, wherein said programming means comprises timer means for setting a projection time for each slide film.

38. A device for automatically selecting a slide film out of a plurality of slide films stored in a tray and projecting said selected slide film as set forth in claim 25, wherein said projection mode selection means also comprises a selection member for sequentially bringing all the slide films one by one into a projection position.

39. A device for automatically selecting a slide film out of a plurality of slide films and projecting said selected slide film comprising:
a. means for storing a plurality of slide films in a linear parallel arrangement;
b. driving means for linearly moving said slide film storage means to place said slide films sequentially in a slide film delivery position step by step for projecting said plurality of slide films one by one;
c. means for selectively displacing a slide film stored in said storage means rectilinearly from the slide film delivery position into a projection position and back, said displacing means applying force edgewise to said slide films;
d. identifying means for identifying the address of a slide film in the slide film delivery position;
e. means for inputting information representing the address of a desired slide film for random access projection;
f. first comparator means coupled to said identifying means and said information inputting means for actuating said driving means in response to the difference signal between the outputs of said detecting means and said information inputting means;
g. projection mode switching means for switching from the random access projection mode to the automatic repeat projection mode in which a number of slide films arbitrarily selected out of said plurality of slide films may be sequentially and repeatedly projected, and vice versa;
h. second means for inputting information for providing information representing the number of slide films to be sequentially and repeatedly projected, and
i. second comparator means coupled to said detecting means and said second information inputting means for actuating said driving means in response to the difference signal between the outputs of said detecting means and said second information inputting means.

40. A device for automatically selecting a desired slide film out of a plurality of slide films and projecting said selected slide film comprising:
a. means for storing therein a plurality of slide films in a linear and parallel arrangement;
b. means for driving and linearly moving said slide film storage means step by step for projecting said plurality of slide films one by one;
c. means for selectively displacing a slide film stored in said storage means between a slide film projection position and a slide film storage position within the storage means, said displacing means applying a force perpendicular with respect to the direction of linear arrangement of said slide films in the storage means;
d. identifying means for identifying the address of a slide film in said storage means in position for displacement by said displacing means;
e. first information inputting means for inputting information representing the address of a desired slide film for random access projection;
f. first comparator means coupled to said identifying means and said first information inputting means for actuating said driving means in response to a difference signal responsive to difference between the outputs of said identifying means and said first information inputting means;

g. projection mode switching means for switching the random access projection mode to the automatic repeat projection mode in which a number of slide films arbitrarily selected out of said plurality of slide films may be sequentially and repeatedly projected, and vice versa;

h. means for deactivating said first comparator means in response to the signal from said projection mode switching means representing the switching from the random access mode to the automatic repeat projection mode;

i. second information inputting means for inputting said number of arbitrarily selected slide films to be sequentially and repeatedly projected;

j. second comparator means for comparing the output of said identifying means with that of said second information inputting means, and k. control means for controlling the advance, stop and reversal of said driving means in response to the output of said second comparator means.

* * * * *

UNITED STATES PATENT OFFICE
CERTIFICATE OF CORRECTION

Patent No. 3,895,864   Dated July 22, 1975

Inventor(s) (1) Masanori UCHIDOI   (2) Tateo YAMADA

It is certified that error appears in the above-identified patent and that said Letters Patent are hereby corrected as shown below:

On the first page of the patent, in Section [30], change the foreign application number to

-- 47-1239 --.

Signed and Sealed this sixteenth Day of December 1975

[SEAL]

Attest:

RUTH C. MASON
*Attesting Officer*

C. MARSHALL DANN
*Commissioner of Patents and Trademarks*